(12) United States Patent
Han et al.

(10) Patent No.: US 9,715,584 B2
(45) Date of Patent: Jul. 25, 2017

(54) BIOMETRIC RECEIPT

(71) Applicant: Apple Inc., Cupertino, CA (US)

(72) Inventors: Byron B. Han, Cupertino, CA (US); Craig A. Marciniak, Cupertino, CA (US); John A. Wright, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/042,936

(22) Filed: Feb. 12, 2016

(65) Prior Publication Data

US 2016/0162675 A1 Jun. 9, 2016

Related U.S. Application Data

(63) Continuation-in-part of application No. 13/841,020, filed on Mar. 15, 2013, now abandoned.

(60) Provisional application No. 61/666,722, filed on Jun. 29, 2012.

(51) Int. Cl.

| | |
|---|---|
| *H04M 3/42* | (2006.01) |
| *H04M 1/66* | (2006.01) |
| *G06F 21/32* | (2013.01) |
| *H04W 12/06* | (2009.01) |
| *H04W 4/02* | (2009.01) |
| *G06Q 99/00* | (2006.01) |
| *H04M 1/67* | (2006.01) |
| *H04W 12/00* | (2009.01) |
| *H04L 29/06* | (2006.01) |

(52) U.S. Cl.
CPC .............. *G06F 21/32* (2013.01); *G06Q 99/00* (2013.01); *H04L 63/302* (2013.01); *H04M 1/67* (2013.01); *H04W 4/02* (2013.01); *H04W 4/028* (2013.01); *H04W 12/00* (2013.01); *H04W 12/06* (2013.01); *H04L 63/0861* (2013.01)

(58) Field of Classification Search
CPC .. H04M 1/66; G06F 2221/2111; G06F 21/32; G06F 21/6245
USPC ............. 455/414.1–414.3, 411, 456.1–456.3, 455/550.1; 715/764
See application file for complete search history.

(56) References Cited

U.S. PATENT DOCUMENTS

| | | | |
|---|---|---|---|
| 7,404,086 B2 | 7/2008 | Sands et al. | |
| 7,929,946 B2 | 4/2011 | Rathus et al. | |
| 8,604,906 B1 * | 12/2013 | Halferty | G05B 1/01 340/5.83 |
| 8,811,948 B2 | 8/2014 | Bandyopadhyay et al. | |
| 9,159,187 B2 * | 10/2015 | Thackston | G07F 17/3206 |

(Continued)

*Primary Examiner* — Dung Hong
(74) *Attorney, Agent, or Firm* — Brownstein Hyatt Farber Schreck, LLP (57) ABSTRACT

An electronic device provides a tracking report to a computing device that is located remotely from the electronic device. The tracking report may include location information that identifies the geographical location of the electronic device, and device user information that identifies the user of the electronic device. The electronic device acquires location information for the tracking report through a location awareness capability such as a global positioning system. The electronic device acquires user identification information for the tracking report through a biometric scanning component, such as a finger print sensor or other device that senses biometric properties when a user is touching or in close proximity to the device.

16 Claims, 7 Drawing Sheets

(56) References Cited

U.S. PATENT DOCUMENTS

| | | | |
|---|---|---|---|
| 2004/0148526 A1* | 7/2004 | Sands | G06F 21/32 726/5 |
| 2010/0216429 A1* | 8/2010 | Mahajan | G06F 21/6245 455/411 |
| 2011/0126280 A1* | 5/2011 | Asano | G06F 21/32 726/19 |
| 2012/0129596 A1* | 5/2012 | Thackston | G07F 17/3206 463/29 |
| 2014/0004828 A1 | 1/2014 | Han et al. | |

* cited by examiner

BIOMETRIC RECEIPT

CROSS-REFERENCE TO RELATED APPLICATION

This application is a continuation-in-part of U.S. patent application Ser. No. 13/841,020, which was filed on Mar. 15, 2013, and entitled "Biometric Receipt," which application claims the benefit under 35 U.S.C. §119(e) of U.S. Provisional Patent Application No. 61/666,722, which was filed on Jun. 29, 2012, and entitled "Biometric Receipt," both of which are incorporated by reference as if fully disclosed herein.

TECHNICAL FIELD

The present invention relates generally to electronic devices, and more specifically to tracking mechanisms for electronic devices.

BACKGROUND

Electronic devices, such as mobile or cellular phones, may be equipped with location awareness capabilities that allow the electronic device to track its own location. For example, the electronic device may includes a global positioning system (GPS) that communicates with a number of orbiting satellites to determine the present location of the electronic device. By using the location awareness capabilities of an electronic device, an individual or group may track the location of the user of the electronic device by using the location of electronic device as a proxy for the location of the user of electronic device. For example, a parent who wishes to track the location of a child may give the child a mobile phones that has location awareness capabilities. By tracking the location of the mobile phone, the parent is able to track the location of the child.

However, the effectiveness of using the location of an electronic device as a proxy for the user of the electronic device is limited by the uncertainty of not knowing whether or not the user is actually carrying the electronic device at a particular time. For example, a child may leave his electronic device in a locker when he leaves school at the end of the day. Because the child is separated from the electronic device, tracking the location child by tracking the location of the electronic device becomes less effective.

SUMMARY

Examples of embodiments described herein may take the form of an electronic device such as a mobile telephone that provides a tracking report to a computing device that is located remotely from the electronic device. The tracking report may include location information that identifies the geographical location of the electronic device, and device user information that identifies the user of the electronic device. The electronic device may acquire location information for the tracking report through a location awareness capability such as a global positioning system. The electronic device may acquire user identification information for the tracking report through a biometric scanning component, such as a finger print sensor or other device that senses biometric properties when a user is touching or in close proximity to the device.

In accordance with various example embodiments described herein, a electronic device may report tracking information periodically or in response to a specific request. When the electronic device compiles data to include in the tracking report, the electronic device may use stored biometric information that was acquired in a recent biometric scan. Alternatively, compiling data to include in the tracking report may include initiating a fresh biometric. A biometric scan that is initiated to acquire information for a tracking report may done discreetly, without the user knowing that the scan is taking place. Alternatively, the user may be alerted that a scan is required and promoted to enter biometric information.

SPECIFICATION

This disclosure relates generally to location tracking using a location aware electronic device that includes a biometric scanning capability. In accordance with embodiments discussed herein, an electronic device may report tracking information that includes the current location of the electronic device in combination with information identifying the user of the electronic device. The electronic device may acquire location information for the tracking report through a location awareness capability such as a global positioning system. The electronic device may acquire user identification information for the tracking report through a biometric scanning component, such as a finger print sensor or other device that senses biometric properties when a user is touching or in close proximity to the device.

By combining location awareness with a biometric scan, an individual or group may more effectively track the location of the user of the electronic device. Because the tracking report identifies the user of electronic device and because the biometric information used to identify the user was input when the user and the electronic were at least in close proximity, the location of the electronic device can be used as a reasonable proxy for the location of the user. For example, a parent who wishes to track the location of child may do so by employing embodiments discussed herein to track the location of the child's mobile phone. Because the tracking report includes information identifying the user of the mobile phone, the parent can know whether or not the child is separated from the phone. It should be noted that parental tracking is discussed herein by way of example and not limitation, and that embodiments discussed herein may be used in other contexts. For example, embodiments discussed herein may be used by courts to track compliance with restraining orders or house arrest boundaries. In another example, governments may track compliance diplomatic geographic restrictions.

The electronic device may report the tracking information periodically or in response to a specific request. When the electronic device compiles data to include in the tracking report, the electronic device may use stored biometric information that was acquired in a recent biometric scan. Alternatively, compiling data to include in the tracking report may include initiating a fresh biometric scan so that the tracking report correctly identifies the current user of the electronic device. A biometric scan that is initiated to acquire information for a tracking report may done discreetly, without the user knowing that the scan is taking place. Alternatively, the user may be alerted that a scan is required and promoted to enter biometric information.

Figure 1:
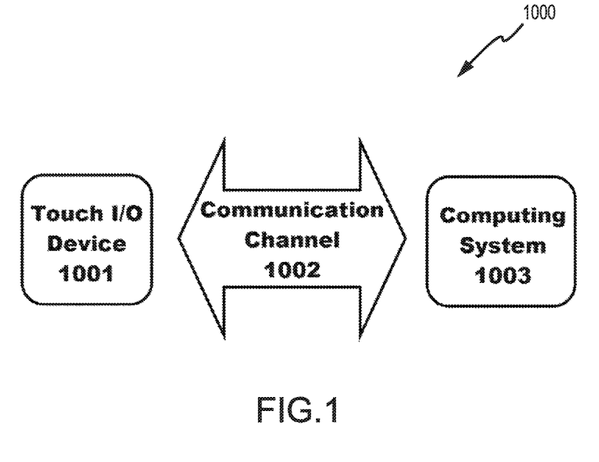
FIG. 1 is a schematic illustration of a electronic device embodiment that includes a touch screen device provided in association with a computing system.

Embodiments described herein may be configured to operate with a variety of sensors, including strip or swipe sensors, array or other two-dimensional sensors, and the like. FIG. 1 is a schematic illustration of an electronic device 1000 in accordance with embodiments discussed herein. As shown in FIG. 1, an electronic device 1000 embodiment may include touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a laptop) or may be separate from computing system 1003. In one embodiment, biometric scanning is provided by a fingerprint sensor capability of the electronic device. Here, the computing system 1003 may be operable to acquire a fingerprint from a finger that is used to enter inputs through the touch I/O device 1001.

Touch I/O device 1001 may include a touch sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display. According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to deice 1001. Software, hardware, firmware or any combination thereof may be used to process the measurements of the detected touches to identify and track one or more gestures.

A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

Figure 2:
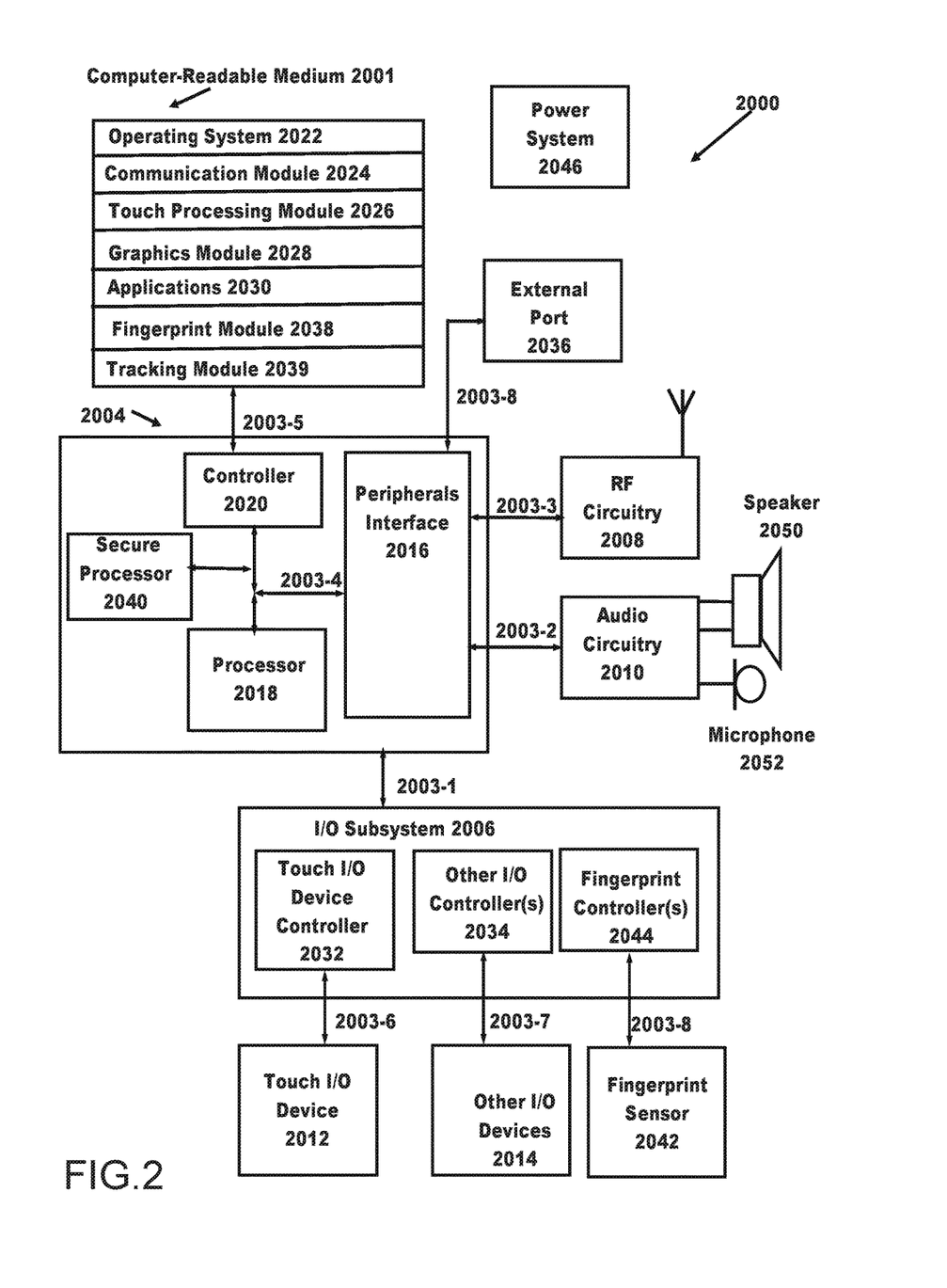
FIG. 2 is a schematic illustration of system architecture for the electronic device shown in FIG. 1.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 2 is a block diagram of one embodiment of system 2000 that generally includes one or more computer-readable mediums 2001, processing system 2004, Input/Output (I/O) subsystem 2006, radio frequency (RF) circuitry 2008 and audio circuitry 2010. These components may be coupled by one or more communication buses or signal lines 2003. Each such bus or signal line may be denoted in the form 2003-X, where X is a unique number. The bus or signal line may carry data of the appropriate type between components; each bus or signal line may differ from other buses/lines, but may perform generally similar operations.

It should be apparent that the architecture shown in FIG. 2 is only one example architecture of system 2000, and that system 2000 could have more or fewer components than shown, or a different configuration of components. The various components shown in FIG. 2 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some embodiments, the software components include operating system 2022, communication module (or set of instructions) 2024, touch processing module (or set of instructions) 2026, graphics module (or set of instructions) 2028, one or more applications (or set of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In embodiments in which touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

System 2000 may further include a fingerprint sensing module 2038 that may at least be executed to, or otherwise function to, perform various tasks associated with the fingerprint sensor, such as receiving and processing fingerprint sensor input. The fingerprint sensing module 2038 may also control certain operational aspects of the fingerprint sensor 2042, such as its capture of fingerprint data and/or transmission of the same to the processor 2018 and/or secure processor 2040. Module 2038 may also interact with the touch I/O device 2012, graphics module 2028 or other graphical display. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

System 2000 may further include a tracking module 2039 for performing the method/functions as described herein in connection with FIGS. 3-7. The tracking module 2039 may at least function to compile tracking reports that are communicated to a remote computing system. In connection with compiling tracking reports, the tracking module 2039 may acquire biometric data for the device user. Here, the tracking module 2039 may cooperate with the fingerprint sensing module 2038 to acquire fingerprint data that can be used to identify the device user. Additionally, the tracking module 2039 may cooperate with the communication module 2024 to receive tracking requests and to send tracking reports.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Embodiments in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2046 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

In addition to the foregoing, the system 2000 may include a secure processor 2040 in communication with a fingerprint sensor 2042, via a fingerprint I/O controller 2044. Secure processor 2040 may be implemented as one or more processing units. The operation of these various elements will now be described.

The fingerprint sensor 2042 may operate to capacitively capture a series of images, or nodes. When taken together, these nodes may form a fingerprint. The full set of nodes may be referred to herein as a "mesh." Although the fingerprint sensor is described as operating capacitively, it is understood that this is an example. In various implementations, the fingerprint sensor may be optical, capacitive, ultrasonic, and/or any other such mechanism for capturing one or more images and one or more portions of one or more fingerprints. It is understood that the embodiments discussed herein may operate with any suitable fingerprint sensor, including swipe or strip sensors, array or other two-dimensional sensors, and so on.

Each node in the mesh may be separately captured by the fingerprint sensor 2042, which may be an array sensor. Generally, there is some overlap between images in nodes representing adjacent portions of a fingerprint. Such overlap may assist in assembling the fingerprint from the nodes, as various image recognition techniques may be employed to use the overlap to properly identify and/or align adjacent nodes in the mesh.

Sensed fingerprint data may be transmitted through the fingerprint I/O controller 2044 to the processor 2018 and/or the secure processor 2040. In some embodiments, the data is relayed from the fingerprint I/O controller 2044 to the secure processor 2040 directly. The fingerprint data is encrypted, obfuscated, or otherwise prevented from being accessed by an unauthorized device or element, by any of the fingerprint sensor 2042, the fingerprint I/O controller 2044 or another element prior to being transmitted to either processor. The secure processor 2040 may decrypt the data to reconstruct the node. In some embodiments, unencrypted data may be transmitted directly to the secure processor 2040 from the fingerprint controller 2044 (or the sensor 2042 if no controller is present). The secure processor may then encrypt this data.

Fingerprint data, either as nodes or meshes, may be stored in the computer-readable medium 2001 and accessed as necessary. In some embodiments, only the secure processor 2040 may access stored fingerprint data, while in other embodiments either the secure processor or the processor 2018 may access such data.

Figure 3:
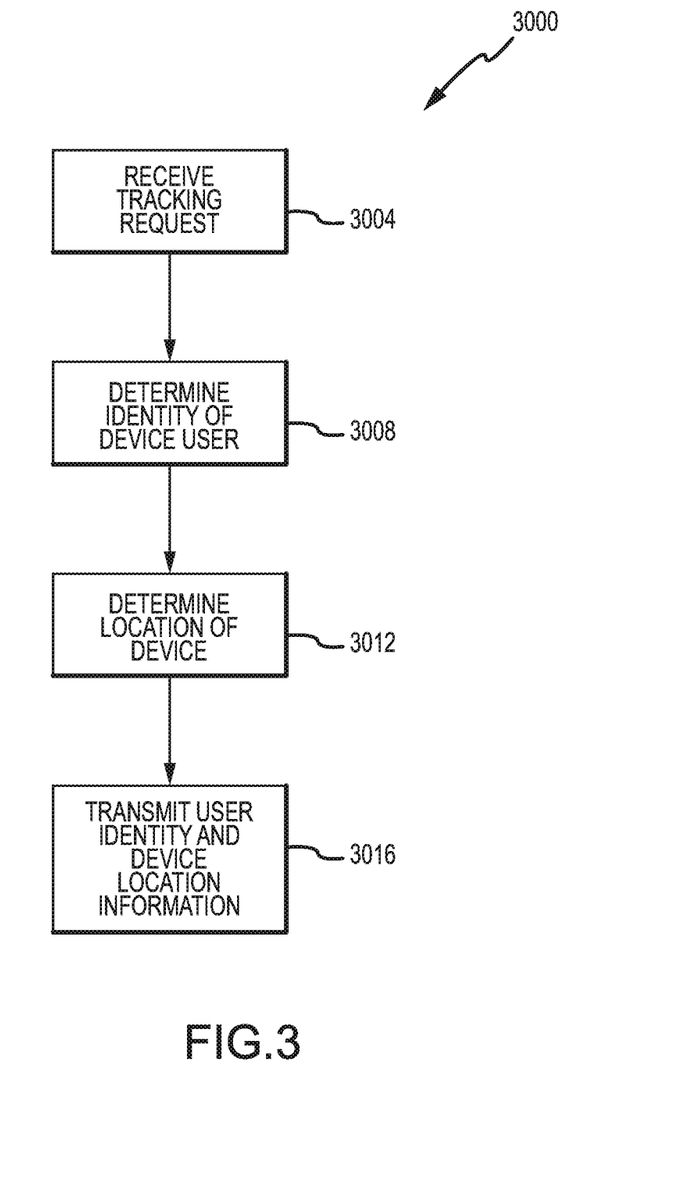
FIG. 3 is a flow chart illustrating a first tracking method embodiment.

FIG. 3 is a flow chart 3000 illustrating a first tracking method embodiment. In the method illustrated by flow chart 3000, the electronic device 1000 reports tracking information in response to a specific request. The specific request may be sent by a computer associated with a person or group that is tracking the device user. For example, the specific request may be from a parent's computer that is tracking the location of a child, a court system computer that is tracking compliance with a restraining order or house arrest boundary, or a governmental computer that is tracking compliance with diplomatic geographic restrictions.

Initially, in operation 3004, the tracking module 2039 receives a tracking request from a computing device that is remote from the electronic device. By way of example, operation 3004 may include the communication module 2024 handling an internet protocol message that contains the tracking request. The internet protocol message may be a wireless communication that is received at the electronic device 1000 through the RF circuitry 2008. Alternatively, the communication module 2024 may handle a communication received at the electronic device 1000 through a wired connection. Once the message is received by the communication module 2024, the communication module 2024 may forward the tracking request to the tracking module 2039 for processing. Once the tracking module 2039 receives the tracking request in operation 3004, control may pass to operation 3008.

Figure 5:
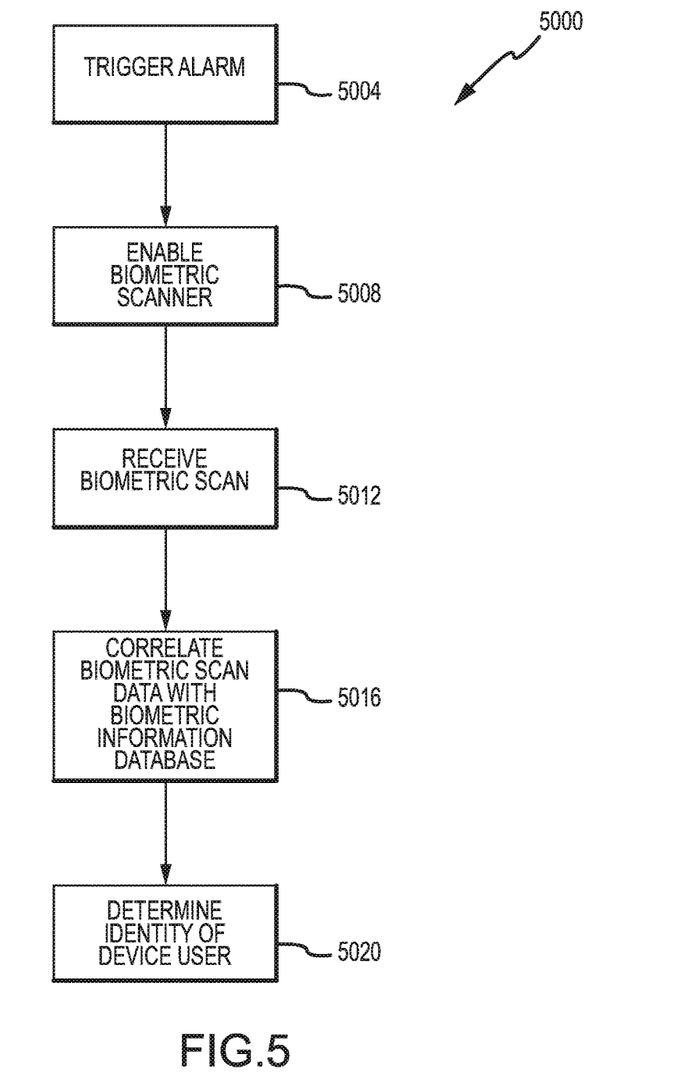
FIG. 5 is a flow chart illustrating a first method of determining the identity of a device user.
Figure 6:
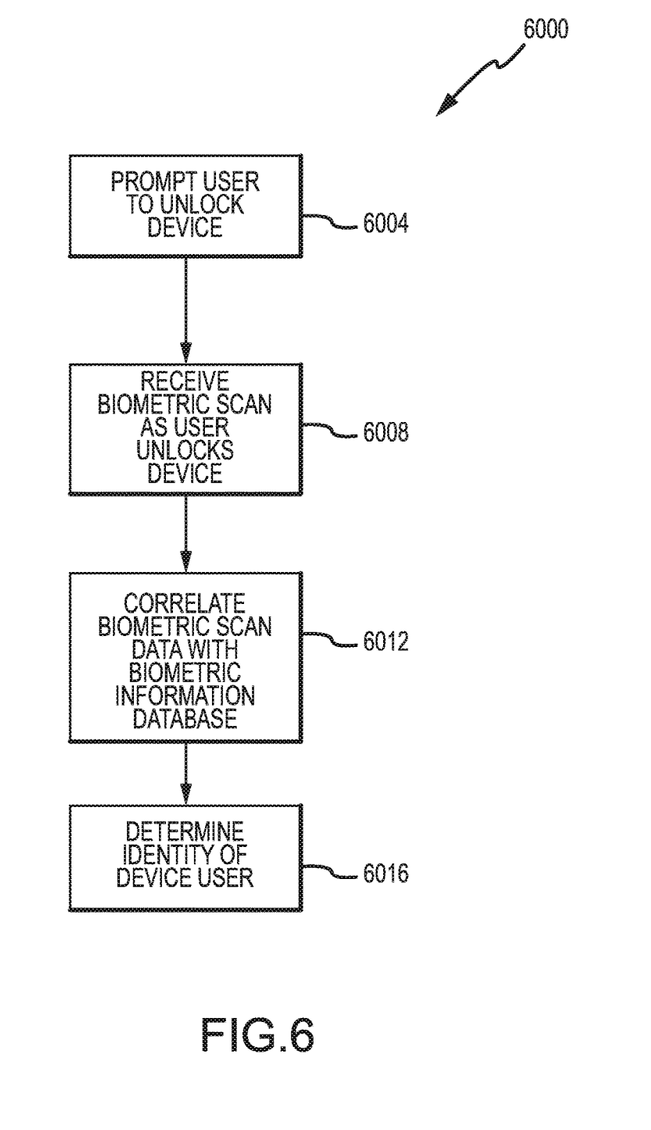
FIG. 6 is a flow chart illustrating a second method of determining the identity of a device user.
Figure 7:
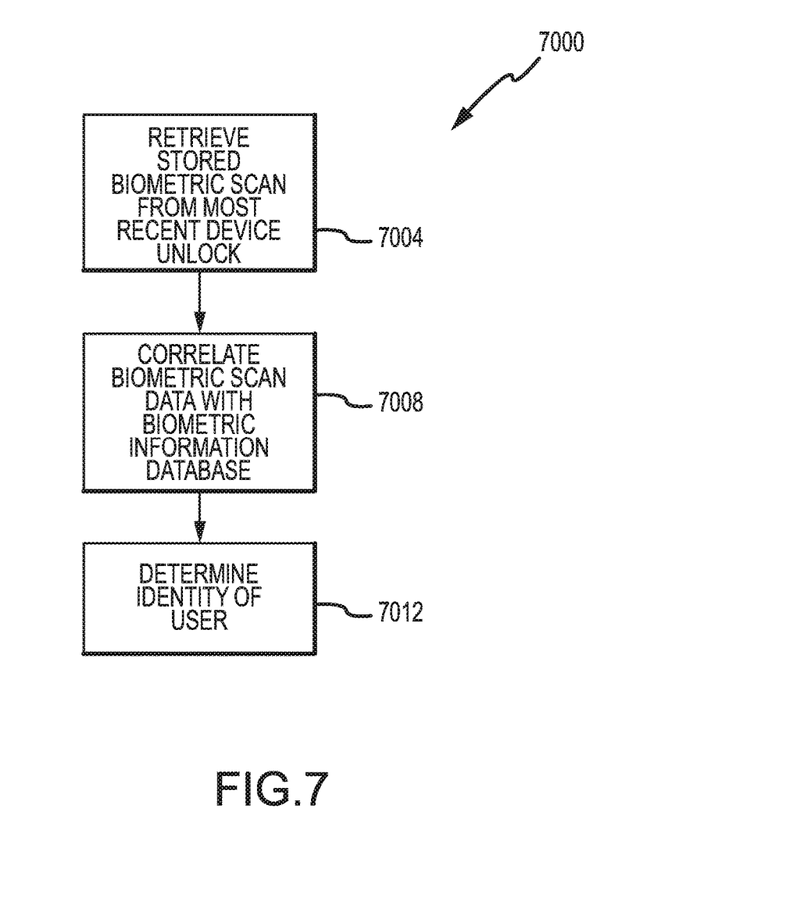
FIG. 7 is a flow chart illustrating a third method of determining the identity of a device user.

In operation 3008, the tracking module 2039 further processes the tracking request by determining the identity of the device user. Here, the tracking module 2039 uses biometric information that is acquired from the user of the electronic device 1000. In one embodiment, the tracking module 2039 uses fingerprint data acquired through the operation of the fingerprint sensor 2042. FIGS. 5-7 illustrate various methods of identifying the device user by fingerprint or other biometric data. In the method illustrated in FIG. 7, the tracking module 2039 uses stored biometric information that was acquired in a recent biometric scan. In other embodiments, the tracking module 2039 may initiate a fresh biometric scan so that the tracking report correctly identifies the current user of the electronic device. For example, in the method illustrated in FIG. 5, the tracking module 2039 initiates a biometric scan discreetly, without the user knowing that the scan is taking place. In the method illustrated in FIG. 6, the tracking module 2039 alerts the user that a scan is required and prompts the user to enter biometric information. Once the tracking module 2039 determines the identity of the device user in operation 3008, control may pass to operation 3012.

In operation 3012, the tracking module 2039 determines the location of the electronic device. Operation 3012 may include determining the location of the electronic device 1000 through the operation of an on-board location awareness subsystem. In one embodiment, the location awareness subsystem of the electronic device 1000 is a global positioning system. Once the tracking module 2039 determines the location of the electronic device 1000 in operation 3012, control may pass to operation 3016.

In operation 3016, the tracking module 2039 reports the user identity and device location information. By way of example, the tracking module 2039 may forward a tracking report to the communication module 2024. The tracking report may include the device user information acquired in operation 3008 and the location information acquired in operation 3012. The communication module 2024 may then format an internet protocol message that includes the tracking report. The communication module 2024 may transmit the message to the remote computer that submitted the request by wired or wireless communication.

Figure 4:
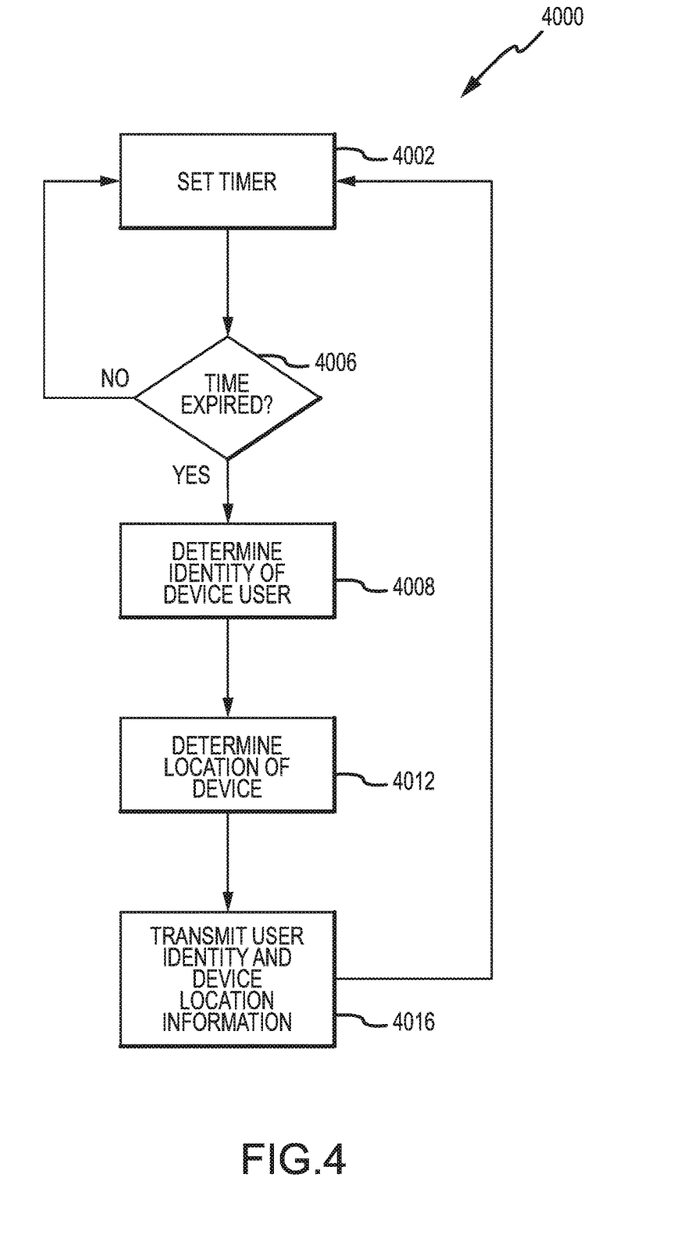
FIG. 4 is a flow chart illustrating a second tracking method embodiment.

FIG. 4 is a flow chart 4000 illustrating a second tracking method embodiment. In the method illustrated by flow chart 4000, the electronic device 1000 reports tracking information on a periodic basis. Tracking information may be included in periodic tracking reports that are sent by the electronic device 1000 to a computer system associated with a person or group that is tracking the device user. For example, the electronic device 1000 may periodically send tracking reports to a parent's computer that is tracking the location of a child, a court system computer that is tracking compliance with a restraining order or house arrest boundary, or a governmental computer that is tracking compliance with diplomatic geographic restrictions.

Initially, in operation 4002, the tracking module 2039 sets a timer. By way of example, the timer may be a countdown timer implemented in either hardware or software. The tracking module 2039 may set the timer to correspond to a desired time interval between operations of sending a periodic tracking report. The tracking module 2039 may be initially programmed to set the timer to a default time interval, which can be adjusted by a user or administrator if desired.

Operation 4006 may be executed following operation 4002. In operation 4006, the tracking module 2039 determines if the timer is expired. If the timer is not yet expired, the tracking module 2039 again executes operation 4006. In this way, the tracking module 2039 loops or otherwise remains suspended until the timer expires. If, in operation 4006, the tracking module 2039 determines that the timer is expired, control passes to operation 4008.

In operation 4008, the tracking module 2039 begins compiling data to be sent in a tracking report by determining the identity of the device user. Here, the tracking module 2039 uses biometric information that is acquired from the user of the electronic device 1000. In one embodiment, the tracking module 2039 uses fingerprint data acquired through the operation of the fingerprint sensor 2042. FIGS. 5-7 illustrate various methods of identifying the device user by fingerprint or other biometric data. Once the tracking module 2039 determines the identity of the device user in operation 4008, control may pass to operation 4012.

In operation 4012, the tracking module 2039 determines the location of the electronic device 1000. Operation 4012 may include determining the location of the electronic device 1000 through the operation of an on-board location awareness subsystem. In one embodiment, the location awareness subsystem of the electronic device is a global positioning system. Once the tracking module 2039 determines the location of the electronic device 1000 in operation 4012, control may pass to operation 4016.

In operation 4016, the tracking module 2039 reports the user identity and device location information. By way of example, the tracking module 2039 may forward a tracking report to the communication module 2024. The tracking report may include the device user information acquired in operation 4008 and the location information acquired in operation 4012. The communication module 2024 may then format an internet protocol message that includes the tracking report. The communication module 2024 may transmit the message to the remote computer that receives the periodic tracking reports by wired or wireless communication. Once the tracking module sends the tracking report in operation 4016, control may again pass to operation 4002 where a timer is set for the next periodic tracking report.

FIG. 5 is a flow chart illustrating a first method of determining the identity of a device user. In the method illustrated by flow chart 5000, the electronic device 1000 conducts a biometric scan as part of compiling information for a tracking report. In the method illustrated by flow chart 5000, the user is aware that the biometric scan is taking place and co-operates in its execution.

Initially, In operation 5004, the tracking module 2039 triggers an alarm or other message that tells the device user that a biometric scan is needed. In one embodiment, the tracking module 2039 triggers an audible alarm in combination with a message displayed on a screen. The message may include an explanation as to why the biometric scan is needed, as well as instructions for inputting biometric information. It should be appreciated that the combination of an audible alarm and a displayed message is given here by way of example and not limitation. Alternative embodiments may include other tactile, audible or visual. mechanisms or combinations of mechanisms for providing alerts.

In operation 5008, the tracking module 2039 enables as a biometric sensor. In one embodiment, the biometric sensor is fingerprint sensor that is implemented as a component of the touch screen system. Here, when the user touches the screen, the fingerprint sensor acquires a finger print image from that portion of the user's finger that touches or is in close proximity to the touch screen. In operation 5008, enabling the biometric sensor may include enabling the fingerprint sensor portion of the touch screen, as well as outputting a graphic on the touch screen that prompts the user to touch the screen in a particular area in order to have her finger tip scanned. Once the tracking module 2039 enables the biometric sensor in operation 5008, control may pass to operation 5012.

In operation 5012, the tracking module 2039 receives a biometric scan. In one embodiment, the user places her finger tip on the touch screen in response to an alert or other prompt. Here, the tracking module 2039 obtains a fingerprint image from through the touch screen and stores the image in memory. Once the tracking module 2039 receives the biometric scan in operation 5012, control may pass to operation 5016.

In operation 5016, the tracking module 2039 correlates biometric scan data with a biometric information database. Here, the tracking module 2039 accesses a fingerprint database that includes records of fingerprint data correlated with names of individuals to whom the fingerprints belong. In one embodiment, the fingerprint database is an on-board database that is stored and maintained locally at the electronic device 1000. The on-board database may include records that are entered for one or more users of the electronic device. In the event that the device is used by only one person, the on-board fingerprint database may include a single entry for the device's user. In accordance with alternative embodiments, the tracking module 2039 may access a biometric information database that is located remotely from the electronic device. Once the tracking module 2039 has correlated the biometric scan data with the biometric information database in operation 5016, control may proceed to operation 5020

In operation 5020, the tracking module 2039 determines the identity of the device user. Using the correlation made in operation 5016, the tracking module 2039 identifies the device user. Here, the tracking module may enter information identifying the user into the tracking report that is transmitted to the remote computer as described above in connection with FIG. 3 and FIG. 4.

FIG. 6 is a flow chart illustrating a second method of determining the identity of a device user. In the method illustrated by flow chart 6000, the electronic device conducts a biometric scan as part of compiling information for a tracking report. In the method illustrated by flow chart 6000, the user is unaware that the biometric scan is taking place.

In operation 6004, the tracking module 2039 prompts the user to unlock the device. In one embodiment, the tracking module 2039 acts like it is locked and presents a false log-in screen to the user. The false log-in screen may have the same appearance as the device's actual log-in screen so that the user is unaware that the screen is being presented specifically to obtain a biometric scan. Specially, the false screen may present a keypad, finger-slide or other unlock mechanism that is familiar to the user. In another embodiment, the electronic device actually locks itself so that user must unlock the device through the operation of device's actual log-in screen.

In operation 6008, the tracking module 2039 receives a biometric scan as the user unlocks the device. In one embodiment, the user places her finger tip on the touch screen in order to unlock the device in response to the electronic device 1000 displaying the log-in screen in operation 6004. Here, the tracking module 2039 obtains a fingerprint image from through the touch screen and stores the image in memory. Once the tracking module 2039 receives the biometric scan in operation 6008, control may pass to operation 6012.

In operation 6012, the tracking module 2039 correlates the biometric scan data with a biometric information database. Here, the tracking module 2039 access fingerprint database that includes records of fingerprint data correlated with names of individuals to whom the fingerprints belong. In one embodiment, the fingerprint database is an on-board database that is stored and maintained locally at the electronic device 1000. The on-board database may include records that are entered for one or more users of the electronic device 1000. In the event that the device 1000 is used by only one person, the on-board fingerprint database may include a single entry for the device's user. In accordance with alternative embodiments, the tracking module 2039 access a biometric information database that is located remotely from the electronic device. Once the tracking module 2039 has correlated the biometric scan data with the biometric information database in operation 6012, control may proceed to operation 6016.

In operation 6016, the tracking module 2039 determines the identity of the device user. Using the correlation made in operation 6012, the tracking module 2039 identifies the device user. Here, the tracking module 2039 may enter information identifying the user into the tracking report that is transmitted to the remote computer as described above in connection with FIG. 3 and FIG. 4.

FIG. 7 is a flow chart illustrating a third method of determining the identity of a device user. In the method illustrated by flow chart 7000, the electronic device 1000 uses stored biometric information that was acquired in a recent biometric scan. By using stored biometric information, the electronic device 1000 may compile data to include in the tracking report without having to conduct a biometric scan.

In operation 7004, the tracking module 2039 retrieves a stored biometric from the most recent device unlock. The biometric data may have been acquired by a biometric scanner such as a fingerprint scan. For example, the fingerprint scanner may have obtained fingerprint data when the last user to unlock the device operated a log-in screen. The biometric data from such a scan may stored locally in memory of the electronic device.

In operation 7008, the tracking module 2039 correlates biometric scan data with a biometric information database. Here, the tracking module 2039 access fingerprint database that includes records of fingerprint data correlated with names of individuals to whom the fingerprints belong. In one embodiment, the fingerprint database is an on-board database that is stored and maintained locally at the electronic device 1000. The on-board database may include records that are entered for one or more users of the electronic device 1000. In the event that the device 1000 is used by only one person, the on-board fingerprint database may include a single entry for the device's user. In accordance with alternative embodiments, the tracking module 2039 access a biometric information database that is located remotely from the electronic device 1000. Once the tracking module 2039 has correlated the biometric scan data with the biometric information database in operation 7008, control may proceed to operation 7012.

In operation 7012, the tracking module 2039 determines the identity of the device user. Using the correlation made in operation 7008, the tracking module 2039 identifies the device user. Here, the tracking module may enter information identifying the user into the tracking report that is transmitted to the remote computer as described above in connection with FIG. 3 and FIG. 4.

CONCLUSION

The foregoing description has broad application. Accordingly, the discussion of any embodiment is meant only to be an example and is not intended to suggest that the scope of the disclosure, including the claims, is limited to these examples.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

What is claimed is:

1. Recites a tracking method, comprising:
    determining, by a first electronic device, identification information associated with a first user of the first electronic device, wherein the identification information comprises biometric data associated with the first user;
    acquiring location information for the first electronic device;
    transmitting, to a second electronic device, a first tracking report that includes an identity of the first user and the location information of the first electronic device;
    subsequently determining, by the first electronic device, identification information for a current user of the first electronic device, wherein the operation of determining identification information for the current user comprises:
    prompting the current user to unlock the first electronic device by presenting a false unlock screen to the current user, wherein the false unlock screen is only presented to obtain a biometric scan from the current user while the current user unlocks the false unlock screen; and
    receiving biometric data associated with the current user as the current user unlocks the false unlock screen;
    acquiring location information for the first electronic device;
    comparing the biometric data associated with the current user with identification information associated with the first user to determine if an identity of the current user matches an identity of the first user;
    when the biometric data associated with the current user matches the biometric data associated with the first user, transmitting, to the second electronic device, a second tracking report that includes the identity of the first user and the location information for the first electronic device;
    when the biometric data associated with the current user does not match the biometric data associated with the first user, comparing the biometric data associated with the current user with biometric data associated with one or more known users of the first electronic device to determine the identity of the current user, wherein the biometric data associated with one or more known users is stored in a memory in the first electronic device;
    when the biometric data associated with the current user matches the biometric data associated with a respective known user, transmitting, to the second electronic device, the second tracking report that includes the identity of the respective known user and the location information for the first electronic device; and
    when the biometric data associated with the current user does not match the biometric data associated with the one or more known users, transmitting, to the second electronic device, the second tracking report that includes the identification information associated with the current user and the location information for the first electronic device.

2. The tracking method of claim 1, further comprising:
    prior to determining identification information for the current user of the first electronic device, receiving, from the second electronic device, a tracking request that specifically requests the second tracking report.

3. The tracking method of claim 1, further comprising:
periodically repeating the operations of determining identification information, acquiring location information, and transmitting a tracking report.

4. The tracking method of claim 1, wherein the operation of determining identification information associated with the first user includes retrieving stored biometric information that was acquired from the first user in a recent biometric scan.

5. The tracking method of claim 4, wherein the operation of determining identification information further comprises comparing the biometric scan of the user with the retrieved stored biometric information from the recent biometric scan.

6. The tracking method of claim 1, wherein the biometric scan is a fingerprint scan.

7. The tracking method of claim 1, wherein the operations of determining identification information, acquiring location information, and transmitting a tracking report are performed upon expiration of at least one timer.

8. The tracking method of claim 1, wherein said operation of acquiring location information for the electronic device further comprises acquiring the location information utilizing a global positioning system.

9. The tracking method of claim 1, further comprising comparing the biometric data associated with the current user with biometric data stored in a database on the second electronic device to determine the identity of the current user.

10. Recites a mobile communication device, comprising:
a processor;
a communication interface communicatively coupled to the processor, the communication interface operable to at least communicate with a remote computing system;
a location awareness subsystem communicatively coupled to the processor and adapted to determine a current geographical location;
a biometric scanner communicatively coupled to the processor and adapted to obtain biometric information from a device user who touches or is in close proximity to the communication device; and
a tracking module stored in a non-transitory computer readable storage medium, the tracking module comprising processor-executable code that, when executed by the processor, presents a false unlock screen that is only presented to obtain biometric information from the device user utilizing the biometric scanner when the device user unlocks the false unlock screen, and transmits a tracking report to the remote computing system through the communication interface, the tracking report comprising the current geographical location and identification information associated with the device user,
wherein the processor is configured to compare the biometric information from the device user with biometric information associated with one or more known device users, and
when the biometric information from the device user matches biometric information associated with a respective known user, the identification information associated with the device user comprises an identity of the device user; and
when the biometric information from the device user does not match biometric information associated with the one or more known device users, the identification information associated with the device user comprises the biometric information.

11. The mobile communication device of claim 10, wherein the tracking module transmits the tracking report in response to receiving a tracking request from the remote computing system through the communication interface.

12. The mobile communication device of claim 10, wherein the tracking module transmits a plurality of tracking reports, the tracking reports separated in time by a predetermined time interval.

13. The mobile communication device of claim 10, wherein the biometric scanner is a fingerprint scanner.

14. The mobile communication device of claim 10, wherein the biometric information associated with the one or more known device users comprises stored biometric information that was acquired in a recent biometric scan.

15. The mobile communication device of claim 10, wherein the location awareness subsystem is a global positioning system.

16. The mobile communication device of claim 10, wherein the tracking module further comprises processor-executable code that, when executed by the processor, compiles the tracking report by the operations of:
receiving the biometric scan through the biometric scanner;
retrieving stored biometric information from a previous biometric scan; and
identifying the device user by comparing the biometric scan with the stored biometric information from the previous biometric scan.

* * * * *

UNITED STATES PATENT AND TRADEMARK OFFICE
CERTIFICATE OF CORRECTION

| | | |
|---|---|---|
| PATENT NO. | : 9,715,584 B2 | Page 1 of 1 |
| APPLICATION NO. | : 15/042936 | |
| DATED | : July 25, 2017 | |
| INVENTOR(S) | : Byron B. Han, Craig A. Marciniak and John A. Wright | |

It is certified that error appears in the above-identified patent and that said Letters Patent is hereby corrected as shown below:

Claim 1, Line 1 should read:
1. A tracking method, comprising:

Claim 10, Line 1 should read:
10. A mobile communication device, comprising:

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*